United States Patent [19]
Robertson

[11] Patent Number: 5,823,080
[45] Date of Patent: Oct. 20, 1998

[54] EXTERNALLY DRIVEABLE CASSETTE WITH KNIFE FOR CUTTING PHOTOSENSITIVE MATERIAL AND CLOSING EXIT SLIT FROM CASSETTE

[75] Inventor: Jeffrey Charles Robertson, Rochester, N.Y.

[73] Assignee: Eastman Kodak Company, Rochester, N.Y.

[21] Appl. No.: 607,746

[22] Filed: Feb. 27, 1996

[51] Int. Cl.⁶ .................................................... B26D 7/00
[52] U.S. Cl. ................................ 83/649; 83/948; 355/29; 396/445
[58] Field of Search ............................. 83/948, 949, 649; 355/28, 29; 225/10–16; 396/445, 411, 417; 242/564.4

[56] References Cited

U.S. PATENT DOCUMENTS

| | | |
|---|---|---|
| 1,764,450 | 6/1930 | Hindle . |
| 1,859,258 | 10/1932 | Beidler . |
| 2,142,853 | 1/1939 | Landrock ................................ 271/2.3 |
| 2,391,191 | 11/1945 | Powers . |
| 2,492,900 | 12/1949 | Swenson ................................ 242/71 |
| 2,728,280 | 12/1955 | Mayo ................................ 396/445 X |
| 3,186,321 | 6/1965 | Kimrey et al. .......................... 396/445 |
| 3,324,753 | 6/1967 | Lindau .................................. 83/650 X |
| 3,373,644 | 3/1968 | Bjelland ................................. 83/650 |
| 3,499,376 | 3/1970 | Swift ...................................... 95/31 |
| 3,691,921 | 9/1972 | Isbell . |
| 3,715,963 | 2/1973 | LeCover . |
| 3,722,999 | 3/1973 | Cunha et al. ............................ 355/45 |
| 3,736,015 | 5/1973 | Dierks et al. ....................... 396/411 X |
| 3,780,634 | 12/1973 | Van Osch . |
| 3,788,153 | 1/1974 | Lee ............................................ 74/68 |
| 3,792,625 | 2/1974 | Asberg ..................................... 74/424 |
| 3,919,905 | 11/1975 | Hoffman .............................. 83/649 X |
| 3,943,786 | 3/1976 | Mills ........................................ 74/384 |
| 3,971,280 | 7/1976 | Inka ..................................... 225/15 X |
| 4,370,041 | 1/1983 | Katsuyama .............................. 354/92 |
| 4,786,946 | 11/1988 | Jessop ..................................... 355/28 |
| 4,834,309 | 5/1989 | Raymond ............................ 242/55.53 |
| 4,894,674 | 1/1990 | Radov . |
| 4,928,897 | 5/1990 | Satou et al. . |
| 5,060,877 | 10/1991 | Bullivant . |
| 5,107,734 | 4/1992 | Armbruster .......................... 83/649 X |
| 5,187,531 | 2/1993 | Ozawa et al. . |
| 5,362,008 | 11/1994 | Nagel et al. . |
| 5,416,553 | 5/1995 | Sakaguchi et al. ..................... 354/321 |

FOREIGN PATENT DOCUMENTS

| 492845 | 7/1992 | European Pat. Off. ................ 83/649 |
|---|---|---|

*Primary Examiner*—Maurina T. Rachuba
*Attorney, Agent, or Firm*—Charles E. Snee, III; Gordon M. Stewart

[57] ABSTRACT

A cassette (10) includes a sliding knife (52) having a slot (70) which slides past a driven pinion (72). Slot (70) includes a curved trailing edge (76) which surrounds the driven pinion when the knife has cut a web material extended from an exit slit (42) of the cassette and then closed the exit slit. Openings (86, 88) in a knife cover (56) permit external access to the knife and driven pinion.

13 Claims, 18 Drawing Sheets

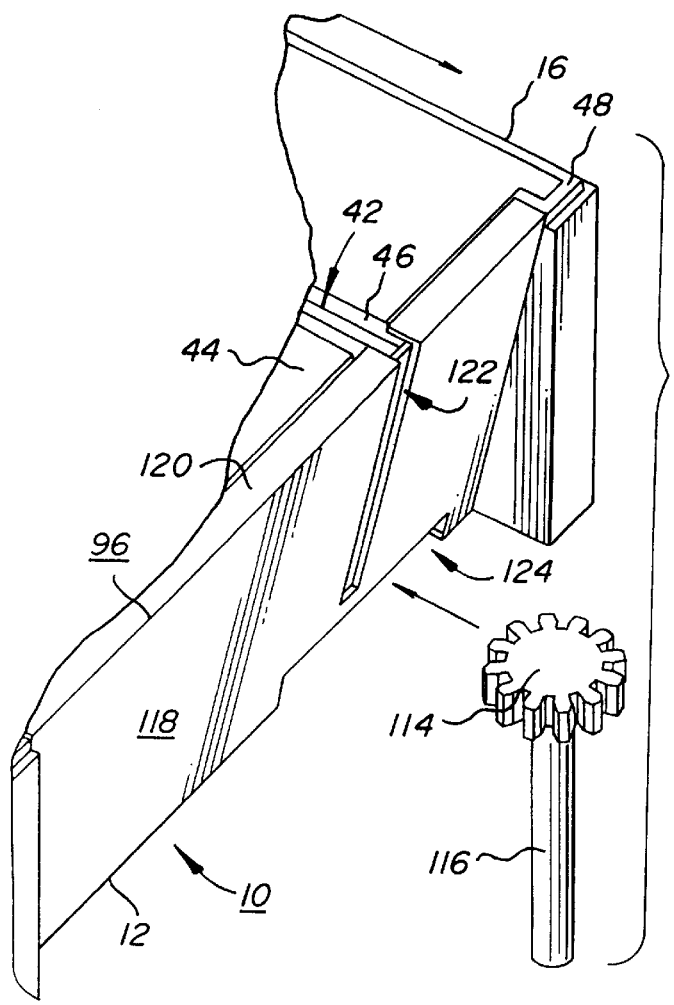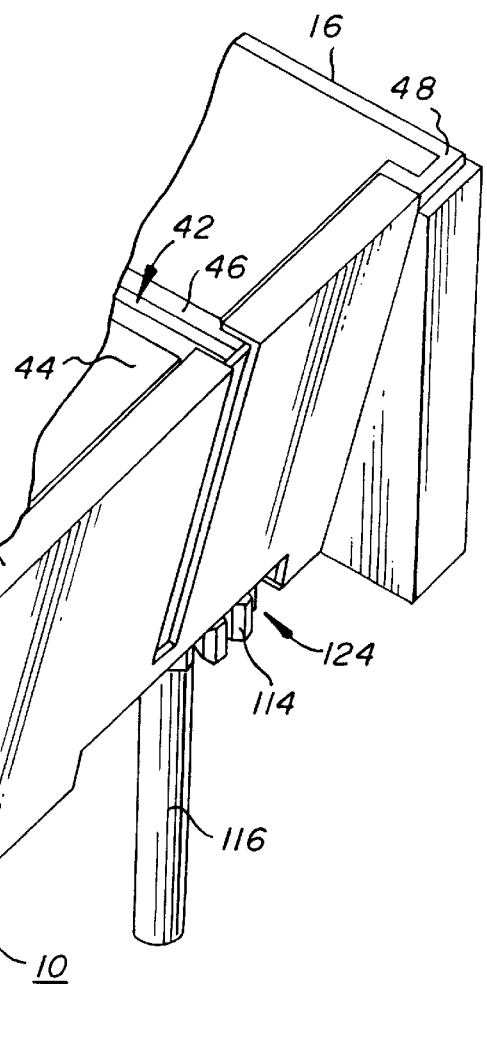
FIG. 16
FIG. 17

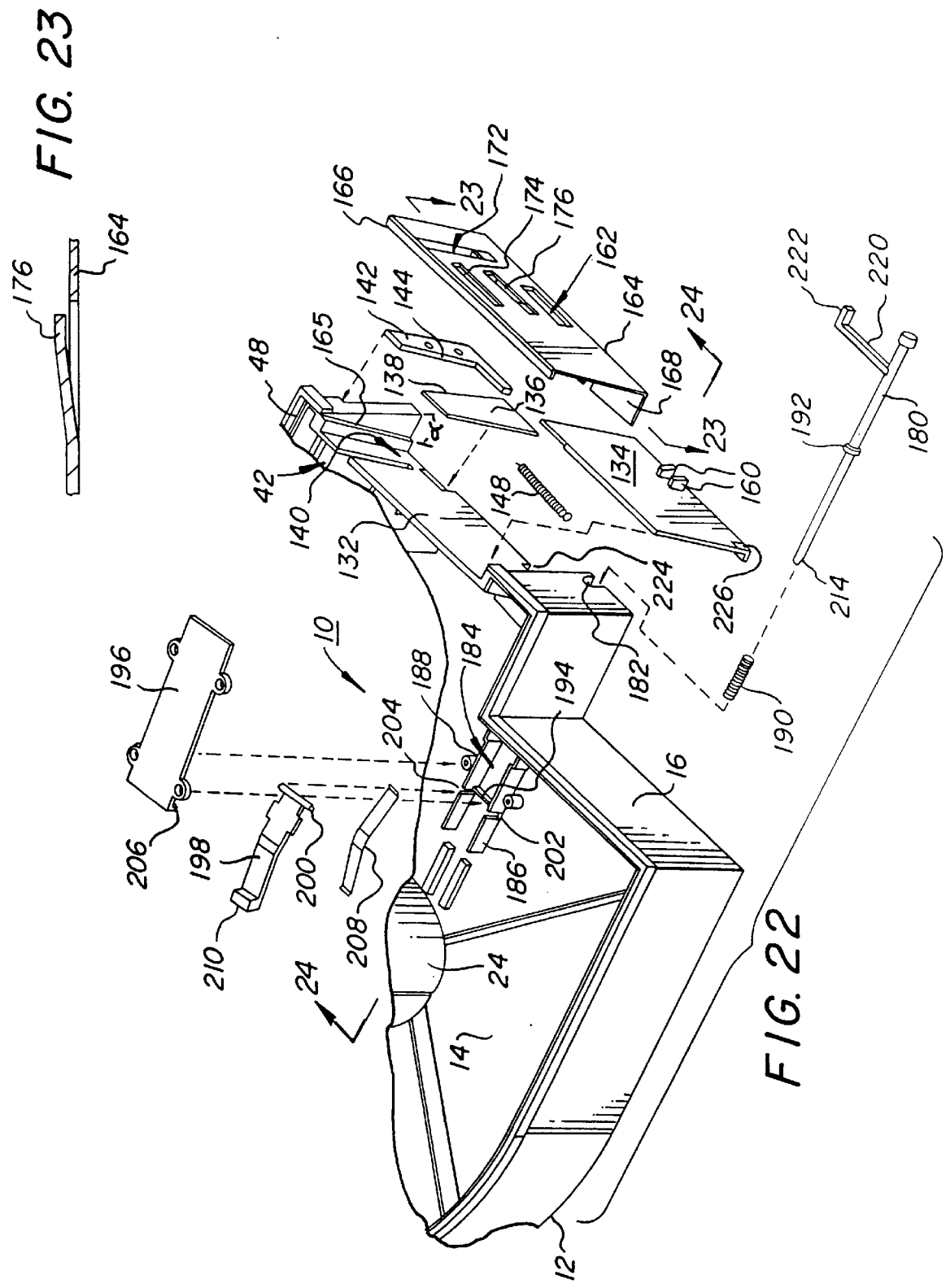

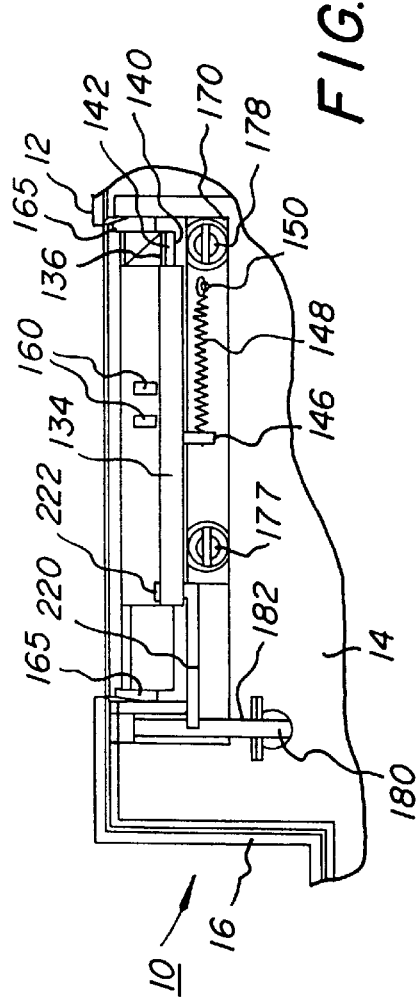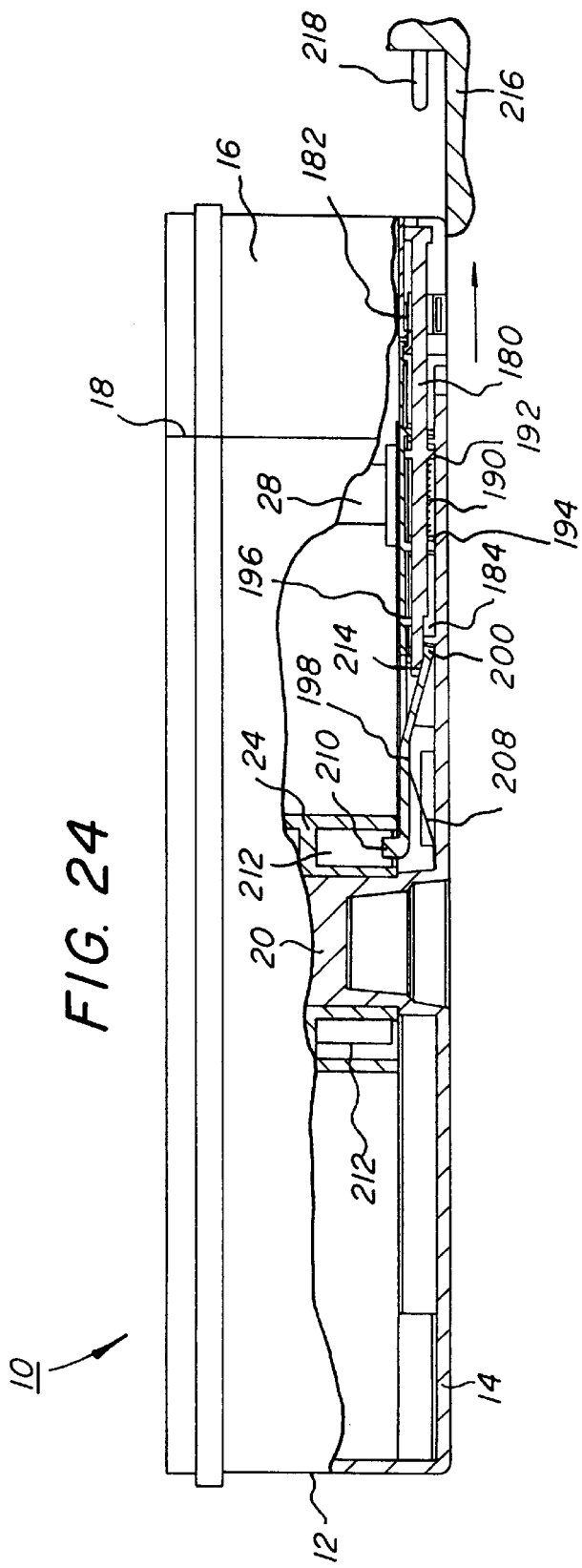

EXTERNALLY DRIVEABLE CASSETTE WITH KNIFE FOR CUTTING PHOTOSENSITIVE MATERIAL AND CLOSING EXIT SLIT FROM CASSETTE

TECHNICAL FIELD

The invention concerns light-tight cassettes for photosensitive web material, such as photographic film or paper. More particularly, the invention relates to such cassettes in which a length of web material is driven from the cassette by driven rollers or sprockets within the cassette and then cut to a desired length.

BACKGROUND ART

In many commercial applications, bulk lengths of photosensitive web materials, such as photographic paper or film, are provided in roll form and mounted for rotation within light-tight convenience cassettes, commonly referred to as daylight load cassettes. The cassettes may include internal features for driving the web material from the cassette, such as those shown in U.S. Pat. Nos. 3,722,999, 3,691,921, 4,928,897 and 5,362,008; or may simply dispense the web material to an external device which extracts the web material, such as shown in U.S. Pat. No. 5,187,531. Cassettes have also been used to remove lengths of exposed photographic film from an associated camera and wind the lengths onto a driven spool or scroll the lengths into a chamber, such as those shown in U.S. Pat. Nos. 1,764,450, 2,492,900 and 3,499,376. An exit slit through the wall of the housing typically includes some sort of static light lock, such as shown in U.S. Pat. No. 4,894,674; or a movable cover for opening and closing the exit slit. In some of the known apparatus, the movable cover also includes a sharpened edge for cutting the material.

In use, a cassette for dispensing web material is loaded into an associated apparatus, such as a "minilab" photographic printer, camera magazine loader or the like, to provide a supply of the material which can be dispensed or extracted from the cassette and cut into short lengths, upon demand. Such apparatus normally operates in a daylight environment and has external panels or cabinetry to prevent ingress of light. A chamber for receiving the cassettes is provided with some form of light-tight door or cover.

While daylight load cassettes of this general type have seen extensive commercial use, a problem can arise when an empty cassette must be replaced with a full one or when one cassette enclosing a partially used roll of a first type of web material must be replaced with another cassette enclosing a second type of web material. Typically, such cassettes have been delivered with a leading end of the web material or an added leader of other material extended from the cassette to be grasped by an operator and threaded into the associated apparatus or attached to a trailing end of a previously loaded web. The light-tight door or cover is then closed and the apparatus is operated to eject any web material that was exposed to light. And, if a first, partially emptied cassette is exchanged for second one enclosing a different web material, an additional length of material from the first cassette must be exposed when the light-tight door is opened. Thus, a need has existed for a cassette which can be inserted into an associated apparatus, and removed from the apparatus while only partially emptied, without any portion of the enclosed web material extending beyond the light-tight interior of the cassette to be exposed while the light-tight door of the associated apparatus remains open.

SUMMARY OF THE INVENTION

A primary objective of this invention is to provide an improved daylight load cassette of a type having internal features for driving the web from the cassette, in which the exit slit for the web material is opened and closed by a movable door having a sharpened edge for cutting the material.

This objective is given only by way of illustrative example. Thus, other desirable objectives and advantages inherently achieved by the disclosed invention may occur or become apparent to those skilled in the art. Nonetheless, the scope of the invention is to be limited only by the appended claims.

The cassette according to the invention is particularly useful for dispensing photosensitive material. A hollow cassette housing includes a peripheral wall with an outside surface and a first exit slit extending through the peripheral wall to the outside surface. Within the housing are provided means for rotatably supporting a roll of photosensitive web material and means for engaging a leading end of a web material to drive the web material through the first exit slit. Uniquely in accordance with the invention, a flat knife blade is movably mounted on the peripheral wall of the housing adjacent the first exit slit, the blade having a cutting edge transverse to web material extended through the first exit slit. In one embodiment, the blade is mounted on an exterior surface of the housing. The blade is movable between a first position in which the first exit slit is open and a second position in which web material has been cut by the cutting edge and the first exit slit is closed by the blade to prevent entry of light into the housing through the first exit slit. A knife cover is provided for the knife blade, the knife cover being fixedly mounted on the exterior surface and including a second exit slit positioned opposite the first exit slit, the knife cover being in sliding engagement with the knife blade, whereby the blade and the second exit slit scissor the web material as the blade moves to the second position, thereby cutting the web material and leaving a cut end of the material inside the housing behind the exit slit closed by the blade. A roll of photographic film or paper may be mounted on the means for rotatably supporting.

The means for engaging may include a drive roller and a pressure roller for engaging opposite sides of the web, the drive roller comprising a drive pinion accessible from outside the housing. Rather than a drive roller and a pressure roller, a sprocket wheel and keeper may be used for perforated web material. Rather than a drive pinion, a knurled shaft may be provided, to be engaged by a driver wheel of an associated apparatus. The pinion may be accessible externally of the housing and a slot may be provided in the knife blade for permitting access to the pinion as the blade moves between the first and second positions. The cover plate may include a further opening to permit external access to the pinion and a further slot to permit external access to the knife blade. A first recess may be provided in the exterior surface for the knife blade and a second recess may be provided in the exterior surface, surrounding the first recess, for the cover plate.

In accordance with the method of the invention, a length of photosensitive material is dispensed from a cassette having a peripheral wall with an exit slit. The method comprises steps of extending a length of said material through said exit slit from said cassette; providing a knife blade adjacent said exit slit; and moving said knife blade across said exit slit both to cut said material and to close said exit slit with said blade, thereby preventing entry of light into said housing through said slit after said web has been cut. Thus the material remaining within the cassette is prevented from being exposed to light by the presence of the knife closing the exit slit.

The invention provides certain advantages. Since no web material extends from the cassette during loading or unloading of the cassette, no material is wasted during such operations. Moreover, the associated apparatus need not include any special mechanisms or control features to eject any exposed web following loading of a cassette.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 16 shows a fragmentary perspective view of the cassette of FIG. 13, with a driver pinion and driver shaft of an associated apparatus positioned for cooperation with the cassette.

FIG. 17 shows a fragmentary perspective view from above the cassette of FIG. 13, with the driver pinion and driver shaft of the associated apparatus fully engaged with the sliding knife in the closed position of the knife.

FIG. 22 shows a fragmentary, exploded perspective view of a cassette embodying yet another type of sliding knife.

FIG. 23 shows a sectional view taken along line 23—23 of FIG. 22.

FIG. 24 shows a partial sectional view taken along line 24—24 of FIG. 22.

FIG. 25 shows a fragmentary view of the under side of the cassette of FIG. 22, with the knife cover plate removed.

DESCRIPTION OF THE PREFERRED EMBODIMENTS

Figure 1:
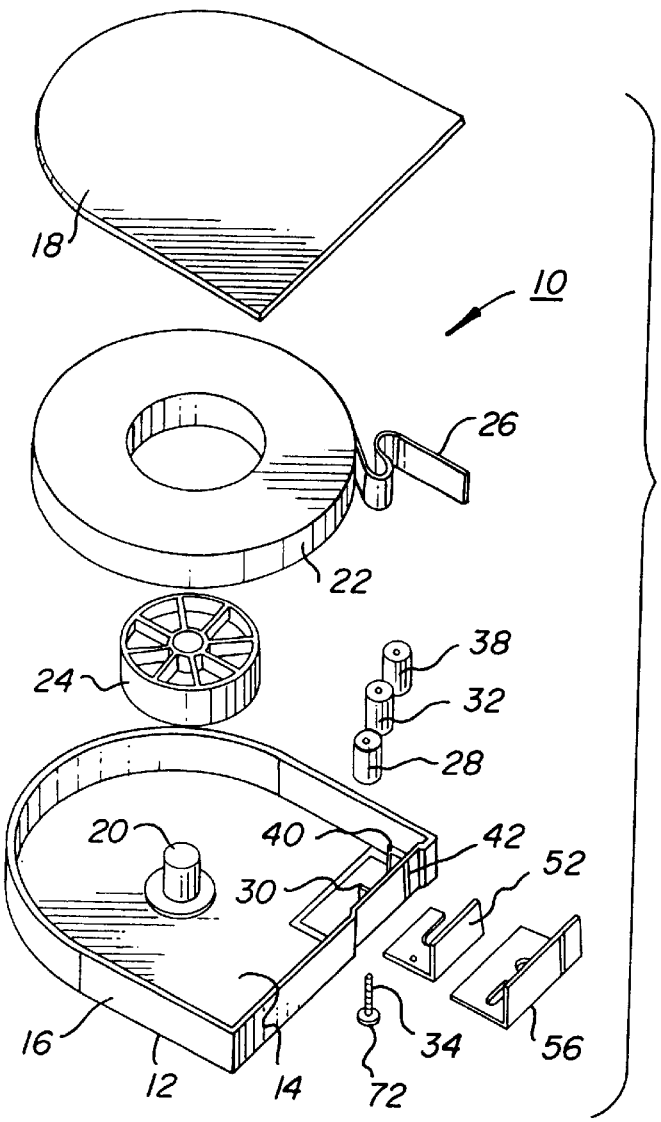
FIG. 1 shows an exploded perspective view of a first cassette according to the invention.

The following is a detailed description of various embodiments of the invention, reference being made to the drawings in which the same reference numerals identify the same elements of structure in each of the several Figures.

Figure 5:
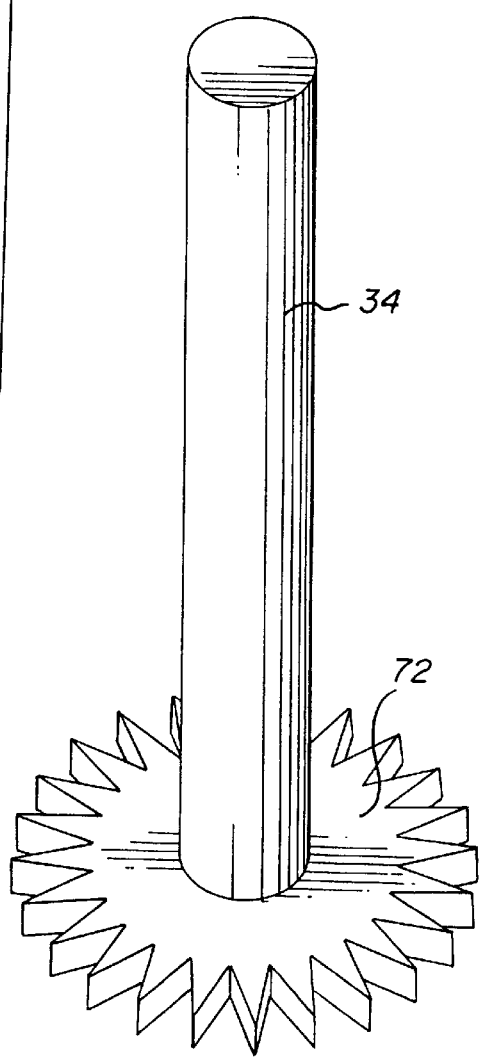
FIG. 5 shows a perspective view of the driven shaft and pinion used to rotate the driven roller for dispensing the web material.
Figure 6:
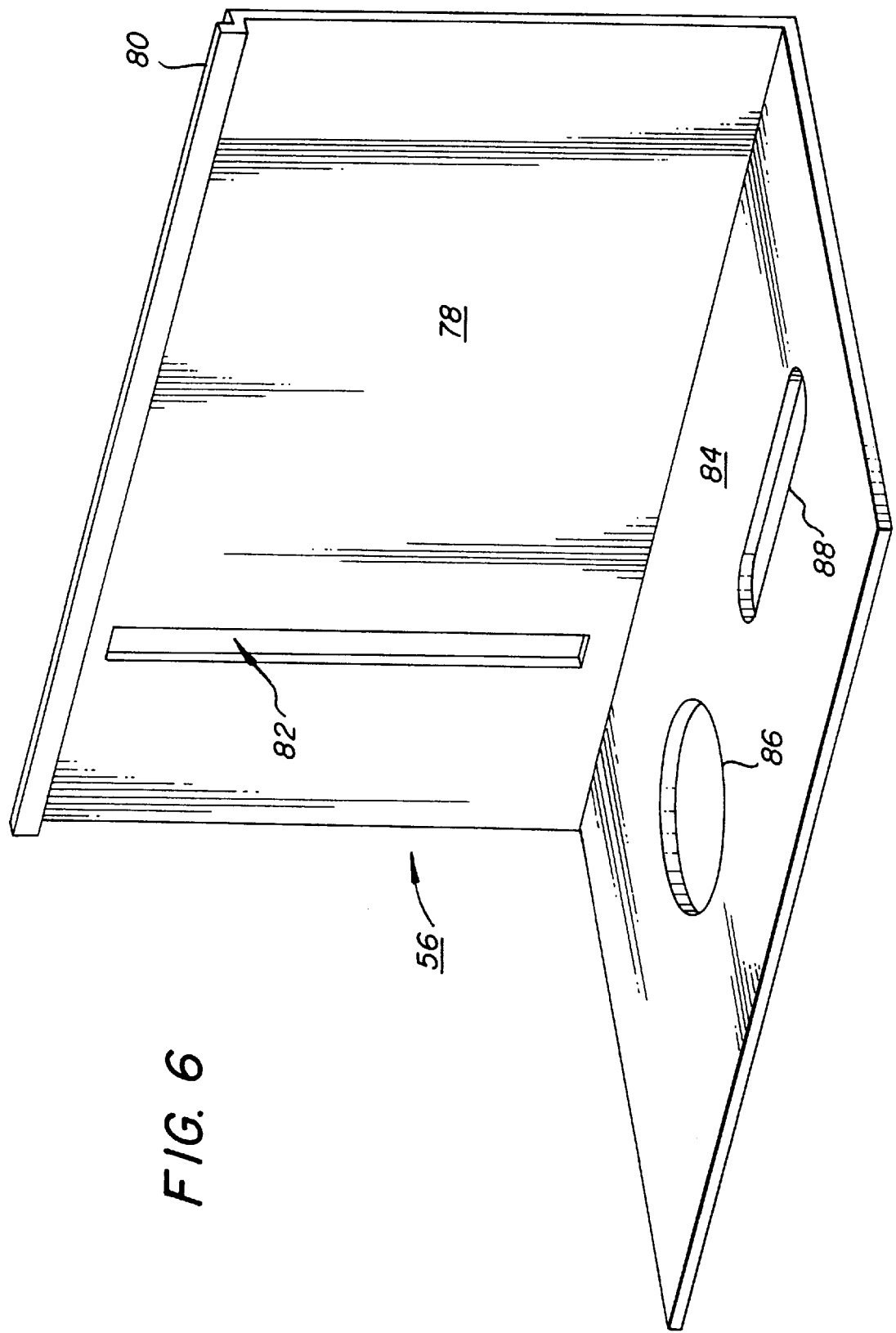
FIG. 6 shows a perspective view of the stationary knife cover.
Figure 7:
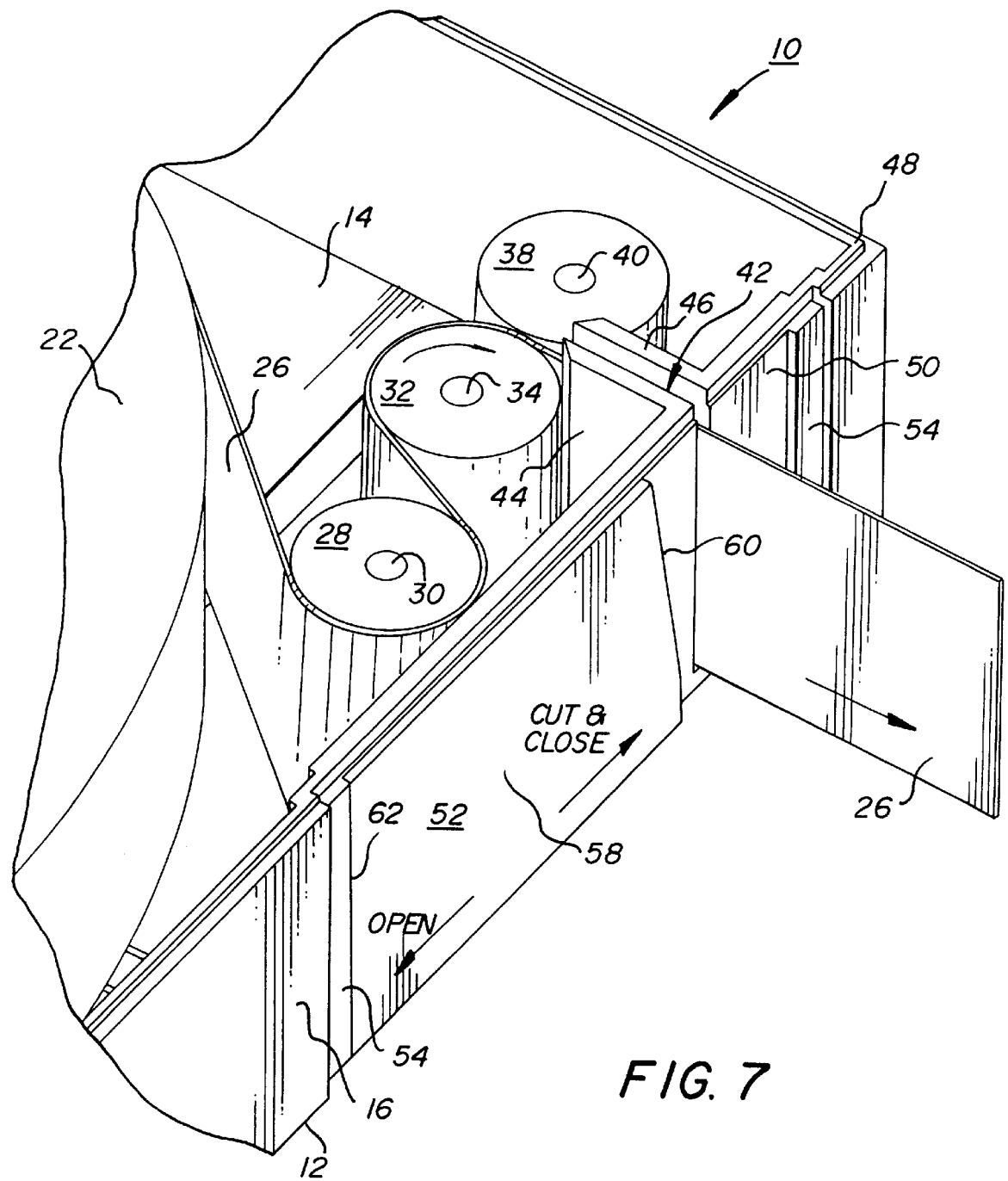
FIG. 7 shows a fragmentary, perspective view of the interior geometry of the cassette near the exit slit for the web material, with the sliding knife fully retracted and the leading end of the web material extended through the exit slit.

Referring now to FIGS. 1 to 12, those skilled in the art can understand the structure and operation of one cassette 10 according to the invention. The cassette comprises a rigid, opaque body or housing 12 which may be made from any suitable material such as metal, molded plastic or the like. A bottom wall 14 is rectangular at one end where the cassette mates with an associated apparatus and rounded at the other end where a roll of web material is mounted. Extended upwardly from and around bottom wall 14 is a peripheral wall 16. A removable cover 18 mates with an upper edge of wall 16 to close the cassette. Within the cassette, a stub shaft 20 is provided as a means for rotatably supporting a roll 22 of photosensitive material, such as photographic film or paper, wound on a central core 24. As shown in FIG. 7, a lead end 26 of the web material is wrapped partially around an idler roller 28 supported for rotation on an upwardly extended shaft 30 mounted to bottom wall 14. Means are provided in the cassette for engaging the lead end to drive the web material from the cassette. The lead end wraps partially around a driven roller 32 supported for rotation with an upwardly extended driven shaft 34 whose lower end extends through an opening 36 in bottom wall 14 for a purpose to be discussed subsequently. Opposite driven roller 32, a pressure roller 38 is supported for rotation on an upwardly extended shaft 40 mounted to bottom wall 14. Rollers 32, 38 define between them a nip through which lead end 26 is driven toward an exit slit 42 through peripheral wall 16, when driven roller 32 is rotated, and so rollers 32, 38 comprise a means for engaging a leading end 26 of the web, to drive the web through the first exit slit 42. Those skilled in the art will appreciate that, if the web includes suitable edge perforations, a toothed sprocket wheel and keeper could be used rather than nip rollers, without departing from the scope of the invention. Alternatively, a reciprocating vacuum shuttle could be used for short lengths of web. On either side of slit 42 within the cassette, a pair of parallel guide walls 44, 46 are provided. A raised lip 48 extends substantially around an upper surface of peripheral wall 16 to mate with a corresponding groove, not illustrated, on an under side of cover 18, thereby providing a seal against entry of light into the cassette.

Figure 3:
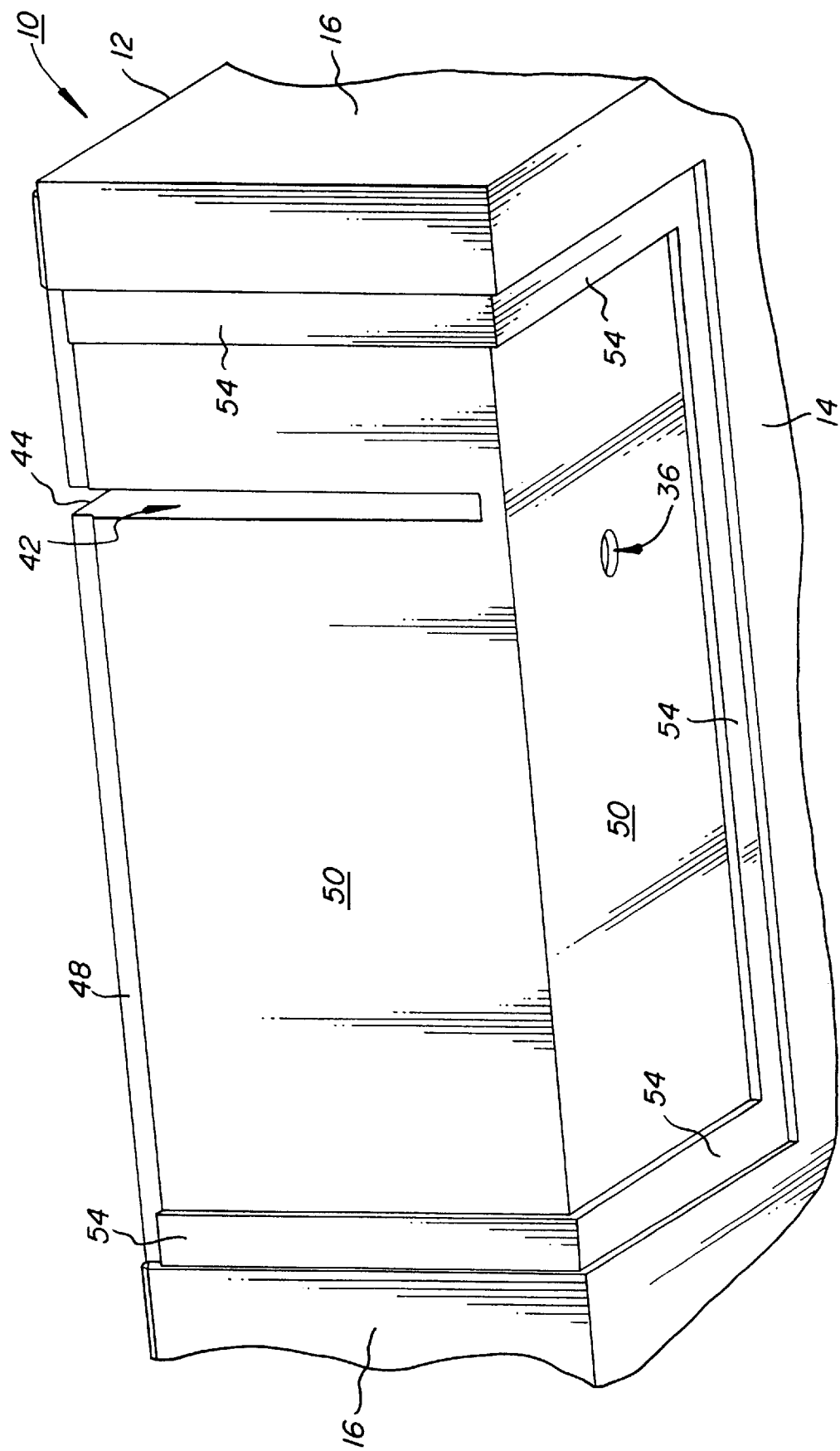
FIG. 3 shows a fragmentary, perspective view of the exterior geometry of the peripheral and bottom walls of the cassette surrounding the exit slit for the web material.
Figure 4:
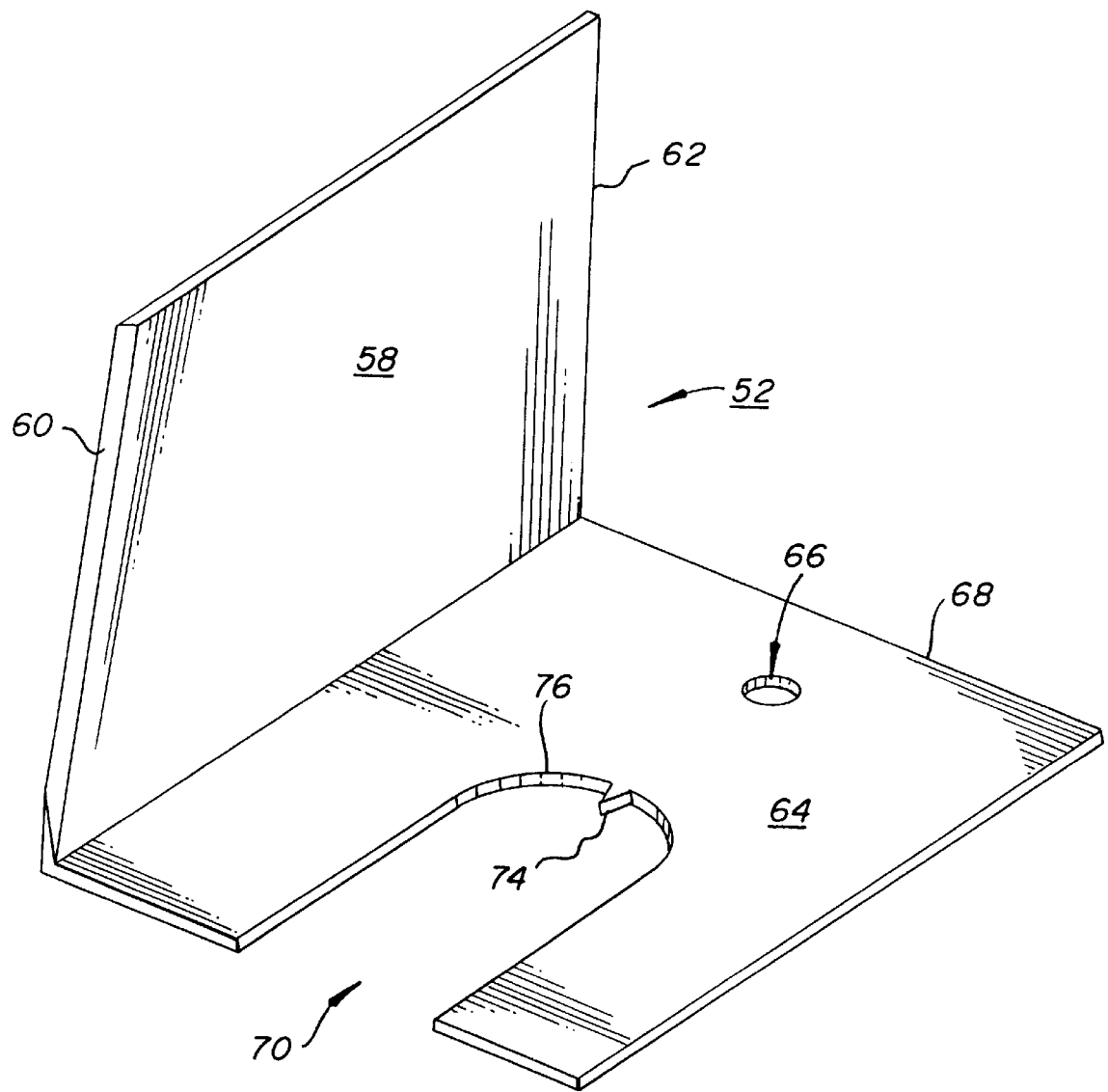
FIG. 4 shows a perspective view of the sliding knife used to cut the web material.
Figure 8:
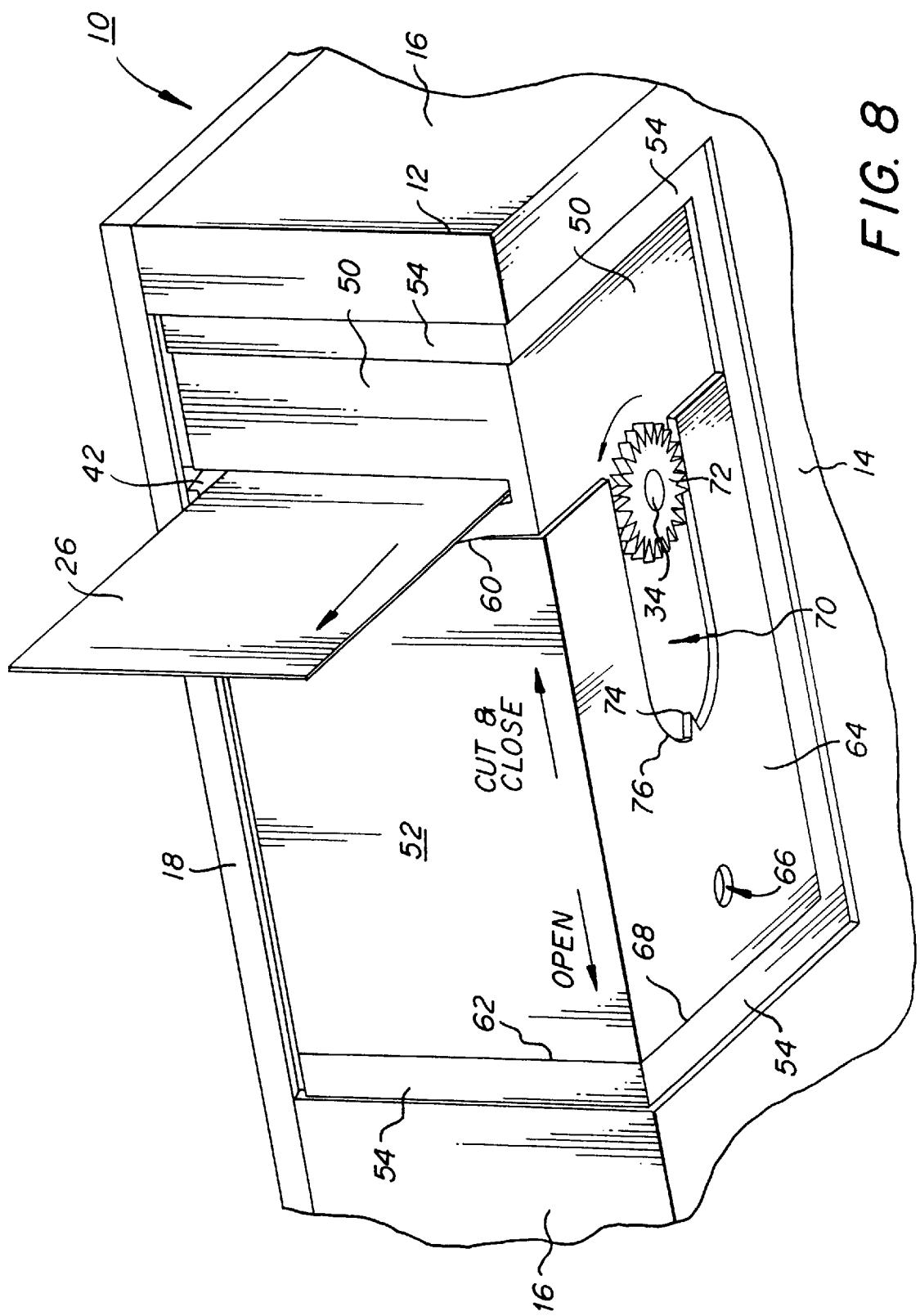
FIG. 8 shows a fragmentary, perspective view of the exterior geometry of the peripheral and bottom walls of the cassette surrounding the exit slit for the web material, with the sliding knife fully retracted, the driven shaft and pinion installed, and the leading end of the web material extended through the exit slit.
Figure 9:
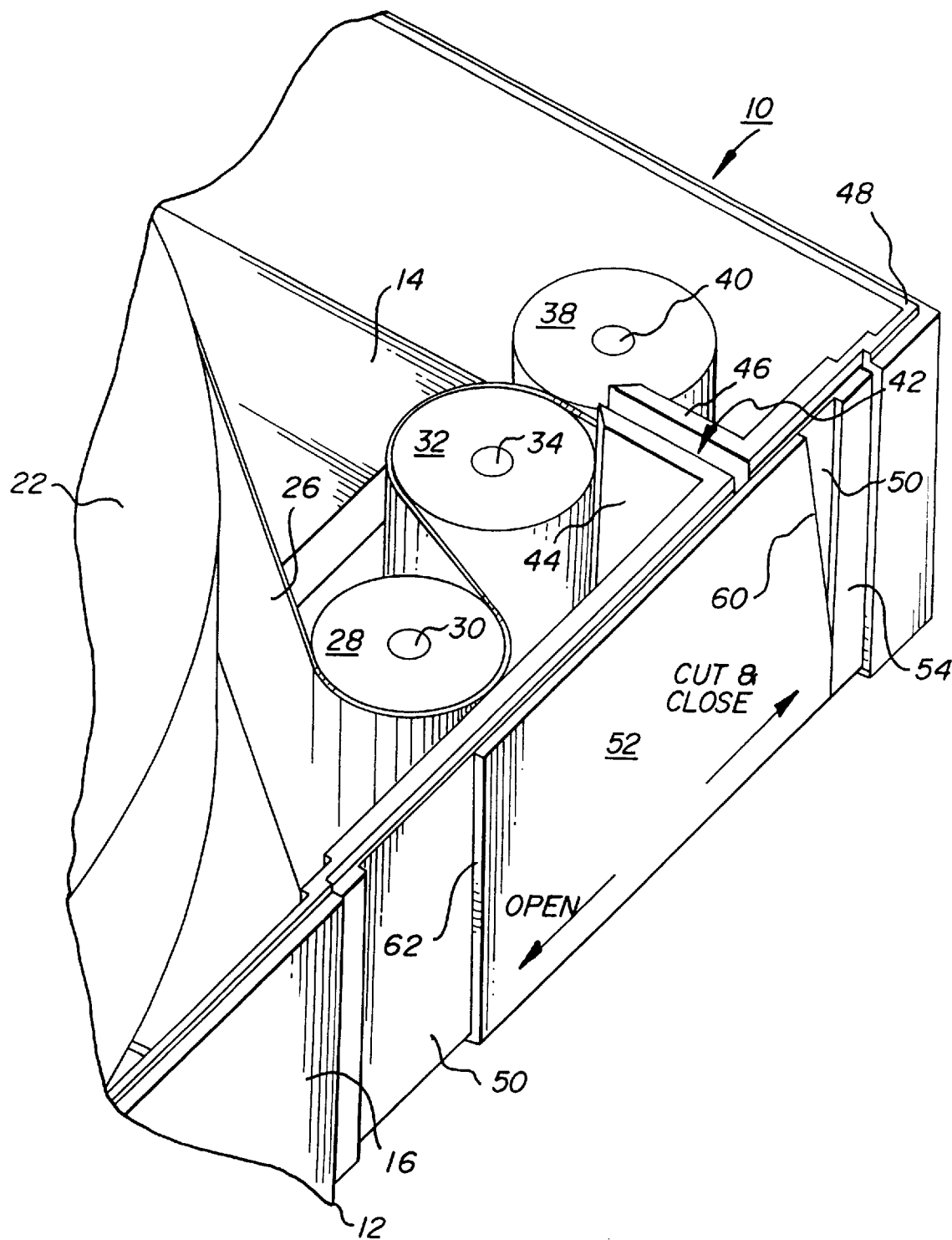
FIG. 9 shows a fragmentary, perspective view of the interior geometry of the cassette near the exit slit for the web material, with the sliding knife fully advanced to cut the web material and close the exit slit.
Figure 10:
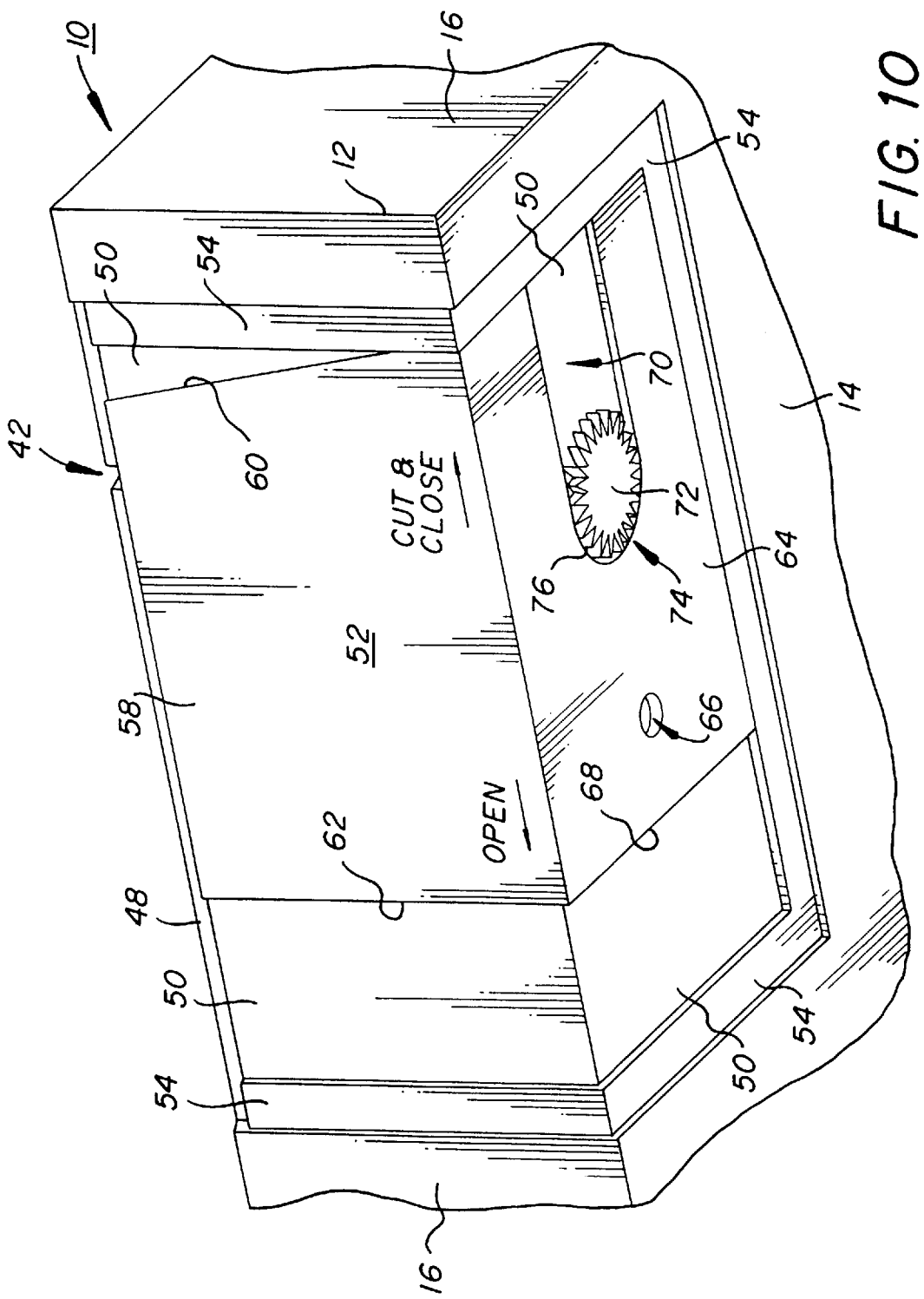
FIG. 10 shows a fragmentary, perspective view of the exterior geometry of the peripheral and bottom walls of the cassette surrounding the exit slit for the web material, with the sliding knife fully advanced to cut the web material and close the slit and with the sliding knife engaged with the driven pinion to prevent rotation of the driven shaft.
Figure 11:
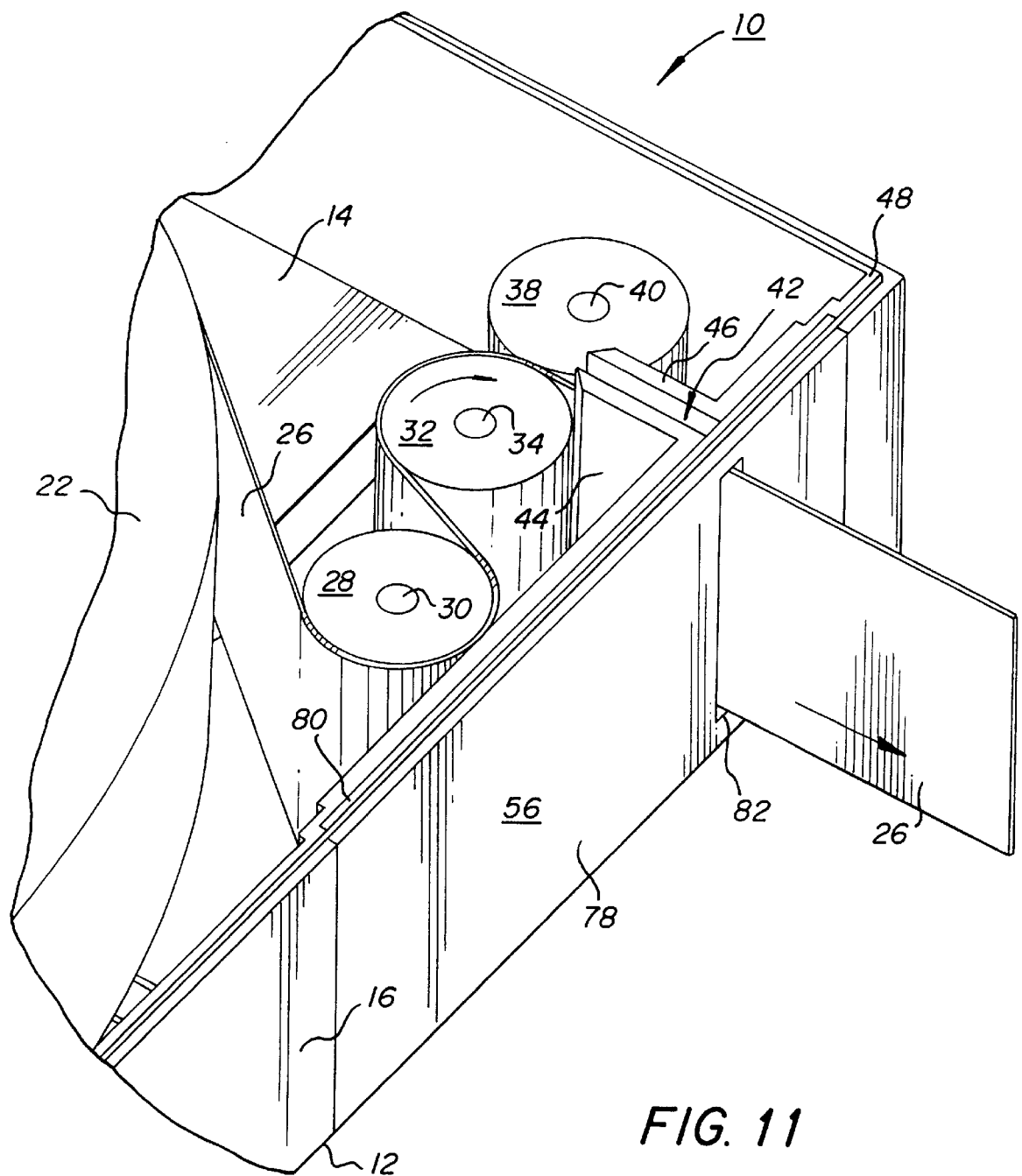
FIG. 11 shows a fragmentary, perspective view of the interior geometry of the cassette near the exit slit for the web material, with the knife cover installed over the retracted sliding knife and the leading end of the web material extended through the exit slit.
Figure 12:
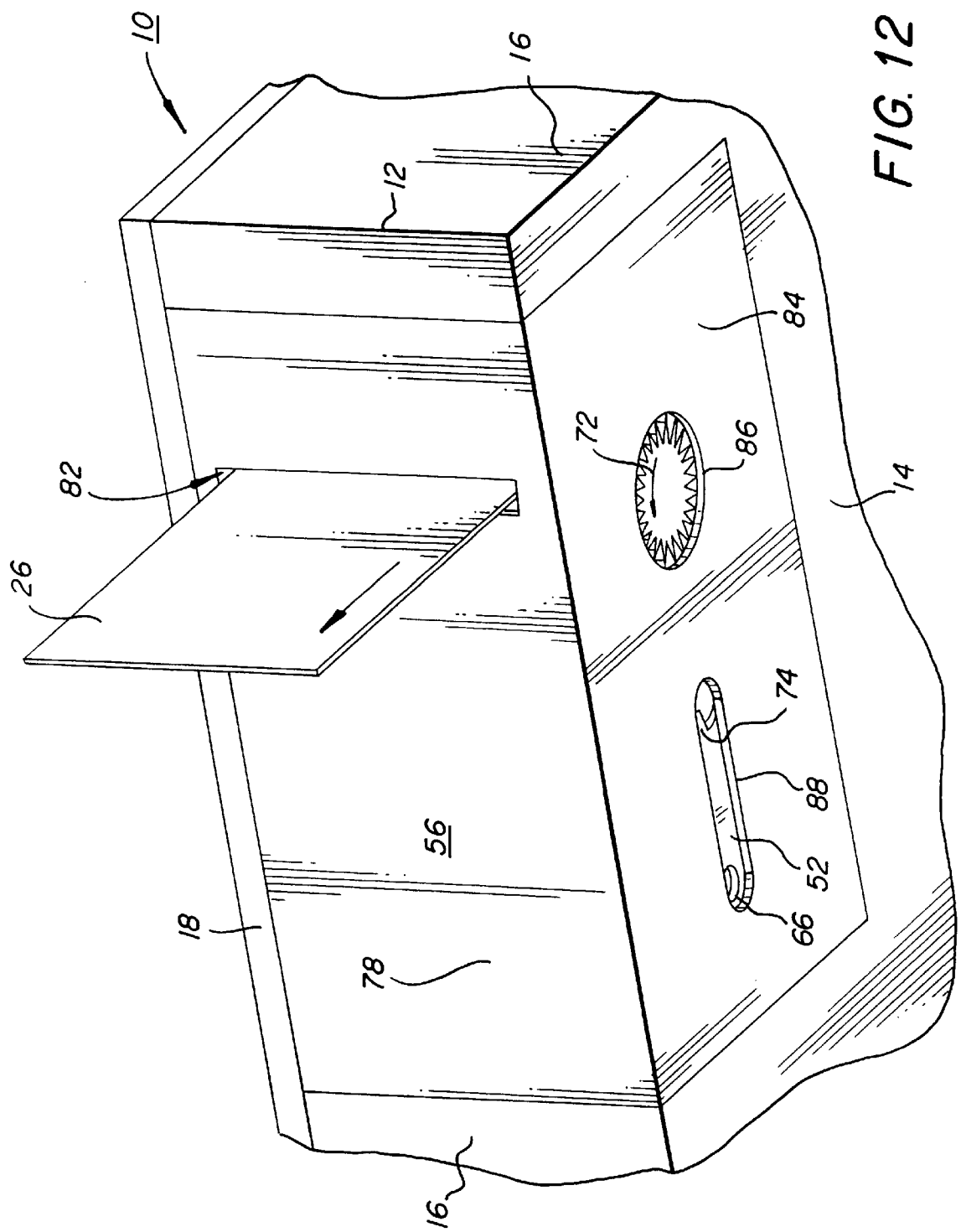
FIG. 12 shows a fragmentary, perspective view of the exterior geometry of the peripheral and bottom walls of the cassette surrounding the exit slit for the web material, with the knife cover installed over the fully retracted sliding knife and the lead end of the web material extended through the exit slit.

As shown in FIG. 3, on the exterior of housing 12 and adjacent exit slit 42 is provided a square-cornered, essentially L-shaped recess 50 which serves as a means for slidably mounting an L-shaped sliding knife 52, shown in FIG. 4. As illustrated, recess 50 wraps around a lower edge of peripheral wall 16. The knife 52 may be made from metal, hard plastic or the like. Extended around recess 50, except along an upper edge of wall 16, is provided a more shallow recess 54 in which is fixedly mounted an L-shaped knife cover 56, shown in FIG. 6. As shown in FIG. 4, knife 52 comprises a flat blade portion 58 having a leading cutting edge 60, which is beveled and set at an acute angle to exit slit 42 and an upwardly extended trailing stop edge 62. Extended essentially at a right angle from blade portion 58 is a flat actuator portion 64 having an actuation hole 66 near a trailing stop edge 68 which is essentially coplanar with stop edge 62. Forward of actuation hole 66 is a clearance slot 70 sized to slide past a driven member or pinion 72 fixedly mounted on an outboard end of shaft 34, as shown in FIGS. 5 and 8. A latch tooth 74 is formed at a central location on a curved trailing edge 76 of clearance slot 70. A spring, not shown, may be provided to urge knife 52 to the right, as seen in FIG. 10, to a position in which the blade portion 58 closes exit slit 42.

Figure 2:
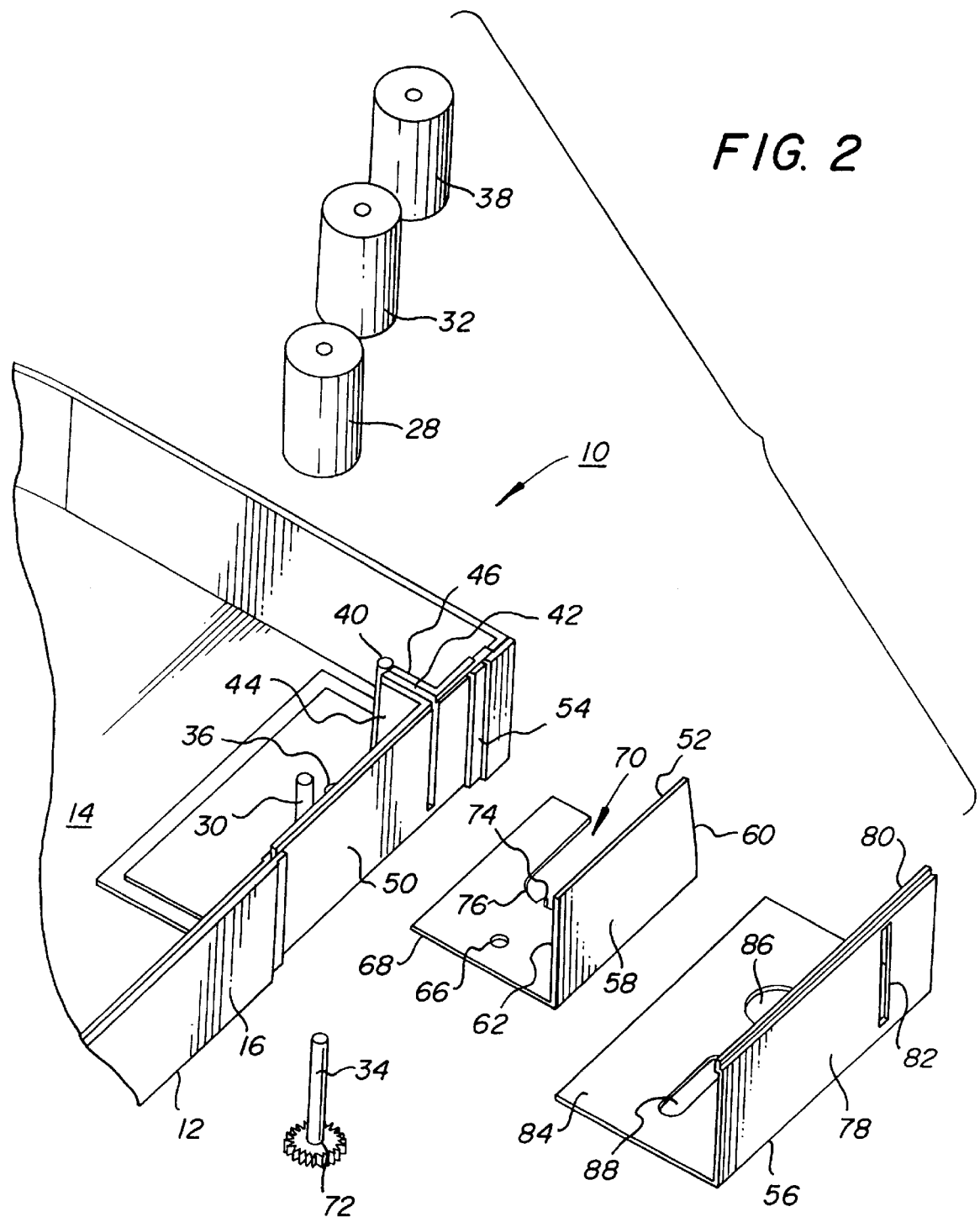
FIG. 2 shows a fragmentary, exploded perspective view of the driving and cutting elements for the web material dispensed from the cassette of FIG. 1.

As shown in FIGS. 2 and 6, knife cover 56 comprises a flat blade cover portion 78 having a land or lip 80 on an upper edge to engage an under side of cover 18 and provide a light-tight seal. An essentially vertical exit slit 82 is formed through the blade cover portion, in alignment with exit slit 42. Extended essentially at a right angle from blade cover portion 78 is a flat actuator cover portion 84 having a through hole 86 for permitting external access to driven pinion 72, and an elongated slot 88 for permitting external access to actuation hole 66. Those skilled in the art will appreciate that, in all of the disclosed embodiments, the knife and cover also could be mounted on an interior surface of wall 16 or could be mounted in a suitable recess or slot within wall 16, without departing from the scope of the invention.

In use of the cassette of FIGS. 1 to 12, the cassette is lowered into the associated apparatus until a probe from the associated apparatus, not illustrated, is inserted through slot 88 into hole 66. The sliding knife 52 is then driven to the left, as viewed in FIG. 7, until a first position is reached in which stop edges 62, 68 engage a side edge of recess 50, thereby opening exit slit 42. Using a driver coupling in the associated apparatus, not illustrated, driven pinion 72 is then engaged through hole 86 to rotate roller 32 and drive leading end 26 from the cassette, as shown in FIGS. 7 and 8. Such a driver coupling could comprise an internal gear for engaging the exterior of pinion 72, for example. When the desired length of web material has been driven from the cassette, rotation of pinion 72 is stopped. The probe in the associated apparatus then drives the sliding knife 52 to the right, as viewed in FIG. 9, until a second position is reached in which cutting edge 60 cuts the web material and, upon completion of the cutting, exit slit 42 is closed by blade portion 58. During the cutting, blade portion 58 and an edge of exit slit 82 at an inside surface of knife cover 56 are in close sliding engagement, thereby cooperating to scissor the web material as the blade moves to the second, closed position. As a result of the illustrated arrangement of sliding knife 52 and knife cover 56, a cut end of the web material remains within the cassette just behind blade portion 58, ready to be dispensed during a later cycle of operation, there being no wasted portion of the web material left extended from the cassette after cutting. Means are operatively associated with the sliding knife 52 for preventing operation of the means for engaging the lead end of the web material. More particularly, rotation prevention means, which comprise latch tooth 74 and driven pinion 72, are provided for preventing rotation of rollers 32, 38. In the second position, latch tooth 74 extends between two teeth on driven pinion 72, to prevent rotation of the pinion which could allow the lead end 26 of the web material to slip from between rollers 32, 38 or to stub against the inside of the blade portion. Of course, latch tooth 74 need not be provided in all embodiments of the invention.

Referring now to FIGS. 13 to 21, those skilled in the art can understand the structure and operation of a second cassette 10 according to the invention. On the exterior of the housing adjacent exit slit 42 is provided an essentially L-shaped recess 90 which slideably receives a sliding knife 92, shown in FIGS. 13 and 14. As illustrated, recess 90 wraps around a lower edge of peripheral wall 16. In some applications of the cassette, the lead end of the web material leaving the cassette must be threaded through a confining path in the associated apparatus. To ease passage through such a path, it is desirable that the lead end be cut straight across the web at an acute angle to the longitudinal axis of the web, thus providing a tapered or slanted leading edge 27, as shown schematically in FIG. 21. To achieve this, a front surface of recess 90 in peripheral wall 16 is angled inwardly at a bottom edge 91 at an acute angle $\alpha$ between a plane of wall 16 and a plane of the recess. See FIG. 13. An essentially L-shaped sliding knife 92 is slideably received in recess 90. Due to the angle of the front surface of recess 90, knife 92 will cut the web material with the desired slanted leading edge. This feature may be used in the other embodiments of the invention. Extended around recess 90, except along an upper edge of wall 16, is provided a more shallow recess 94 in which is fixedly mounted an essentially L-shaped knife cover 96, shown in FIGS. 13 and 15.

Figure 13:
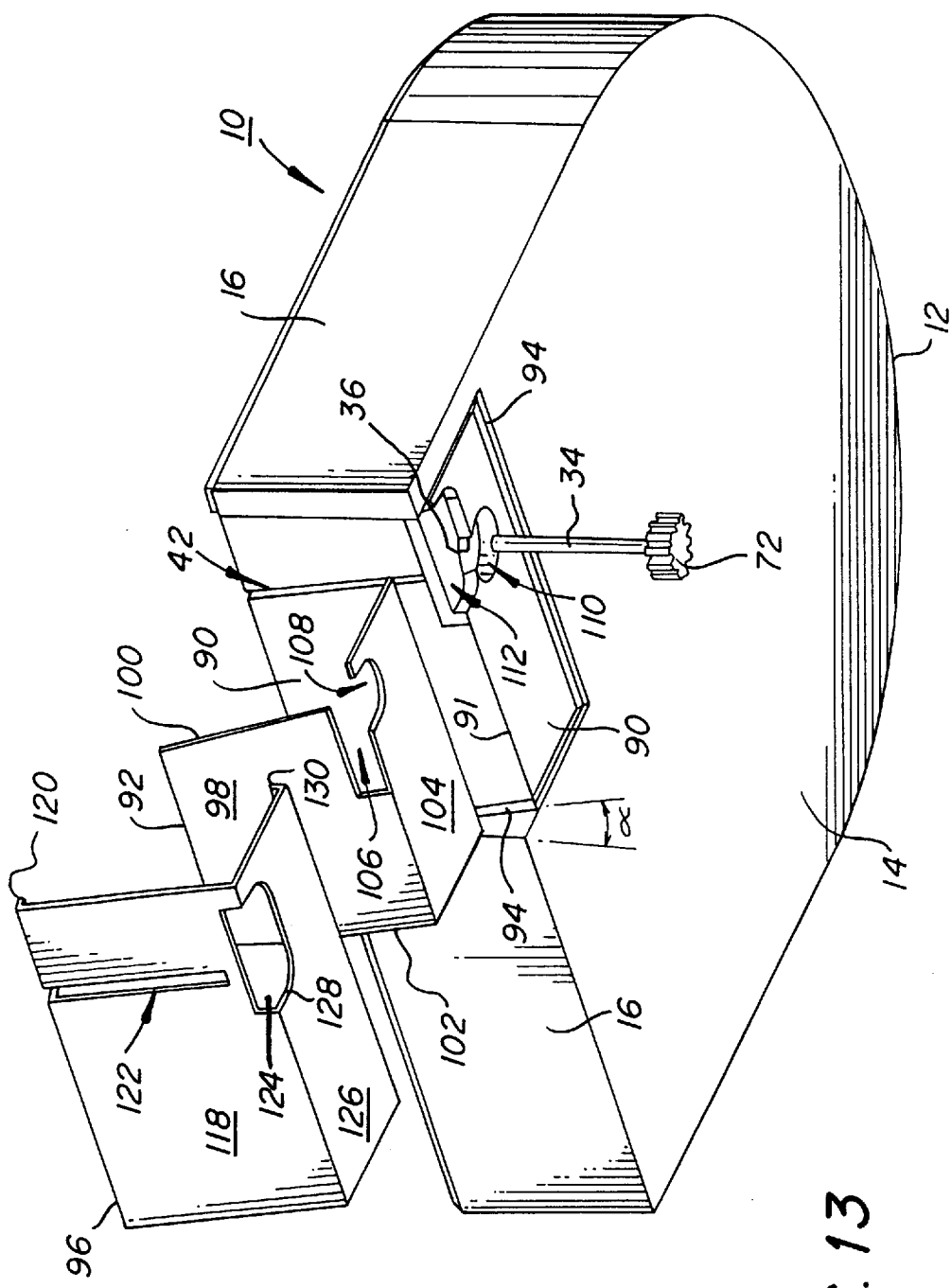
FIG. 13 shows an exploded perspective view from below a cassette embodying an alternative type of sliding knife.
Figure 14:
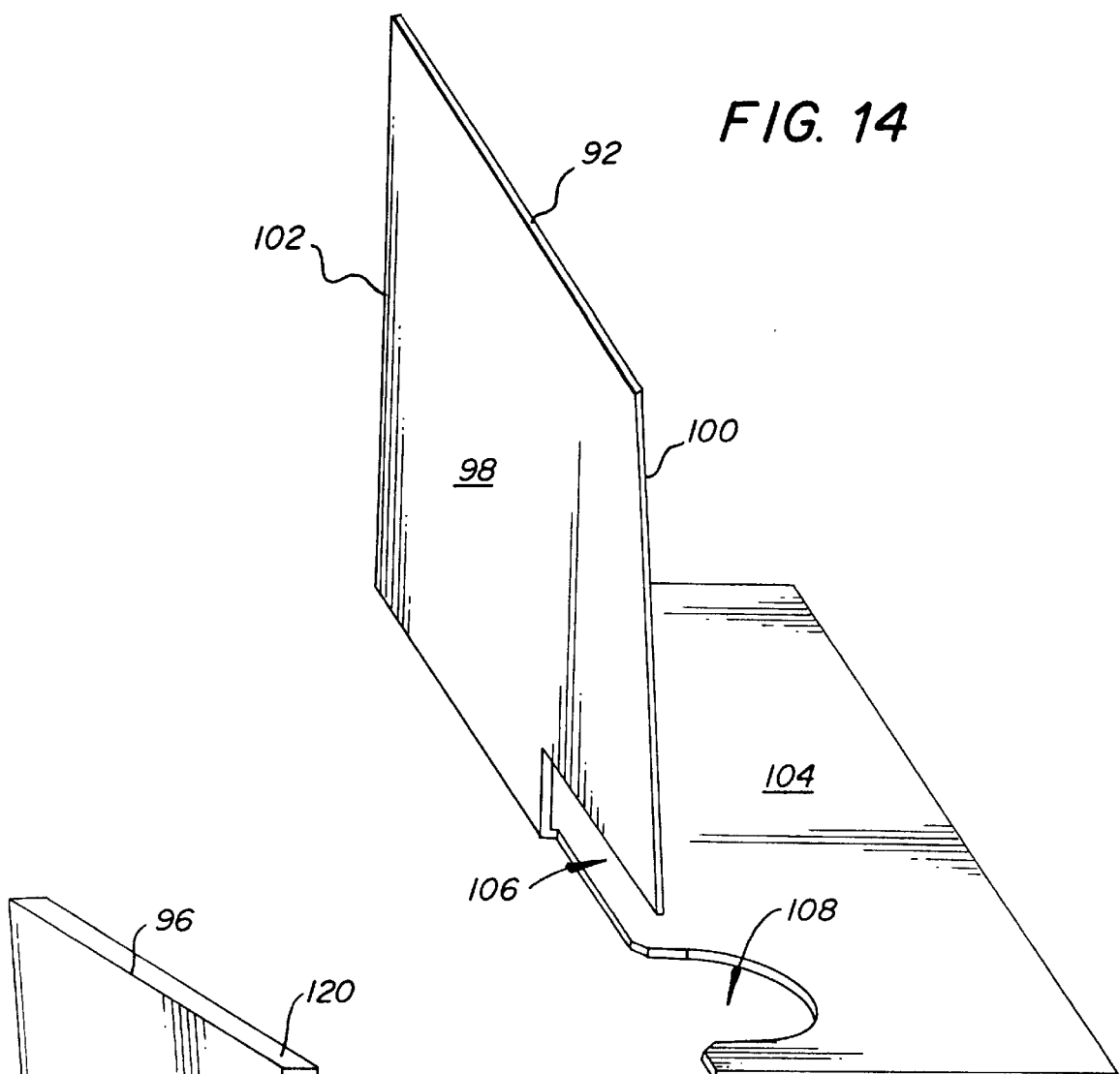
FIG. 14 shows a perspective view of a sliding knife for the cassette of FIG. 13.

As shown in FIG. 14, knife 92 comprises a flat blade portion 98 having a leading cutting edge 100, which is beveled and set at an acute angle to exit slit 42; and an upwardly extended trailing stop edge 102. Extended essentially at a obtuse angle from blade portion 98 is a flat actuator portion 104. At a lower edge of blade portion 98 just behind edge 100 is an essentially horizontal access slot 106. Opposite slot 106, actuator portion 104 includes an essentially U-shaped recess 108. Toward the back of a portion of recess 90 which extends into bottom wall 14 is provided an essentially circular recess 110 for receiving driven pinion 72. Adjacent to recess 110 is an oblong recess 112 which opens both into recess 110 and through a front surface of recess 90, just below exit slit 42. A spring, not shown, may be provided to urge knife 92 to the right, as seen in FIG. 13, to a position in which the blade portion closes exit slit 42. As shown in FIGS. 16 to 21, a driver pinion 114 is provided for rotation and translation with a driver shaft 116 of an associated apparatus, not illustrated.

Figure 15:
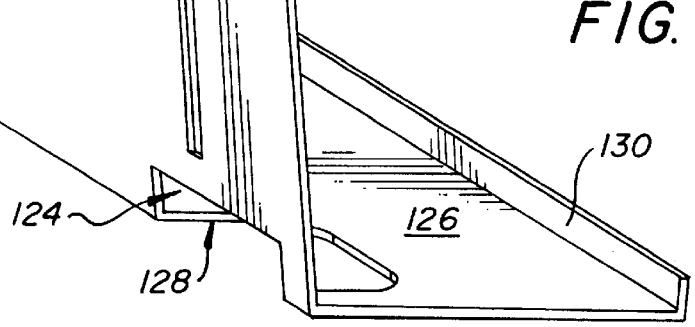
FIG. 15 shows a perspective view of a knife cover for the cassette of FIG. 13.

As shown in FIGS. 13 and 15, knife cover 96 comprises a flat blade cover portion 118 having a lip 120 on an upper edge to engage an upper edge of peripheral wall 16. An essentially vertical exit slit 122 is formed through the blade cover portion 118, in alignment with exit slit 42. Below exit slit 122, an essentially horizontal access slot 124 is provided for driver pinion 114, opposite recess 112. Extended at an obtuse angle from blade cover portion 118 is a flat actuator cover portion 126 having an essentially horizontal access slot 128 for permitting external access by driver pinion 114 to driven pinion 72. A lip 130 extends from cover portion 126 to engage a rear edge of recess 94.

Figure 18:
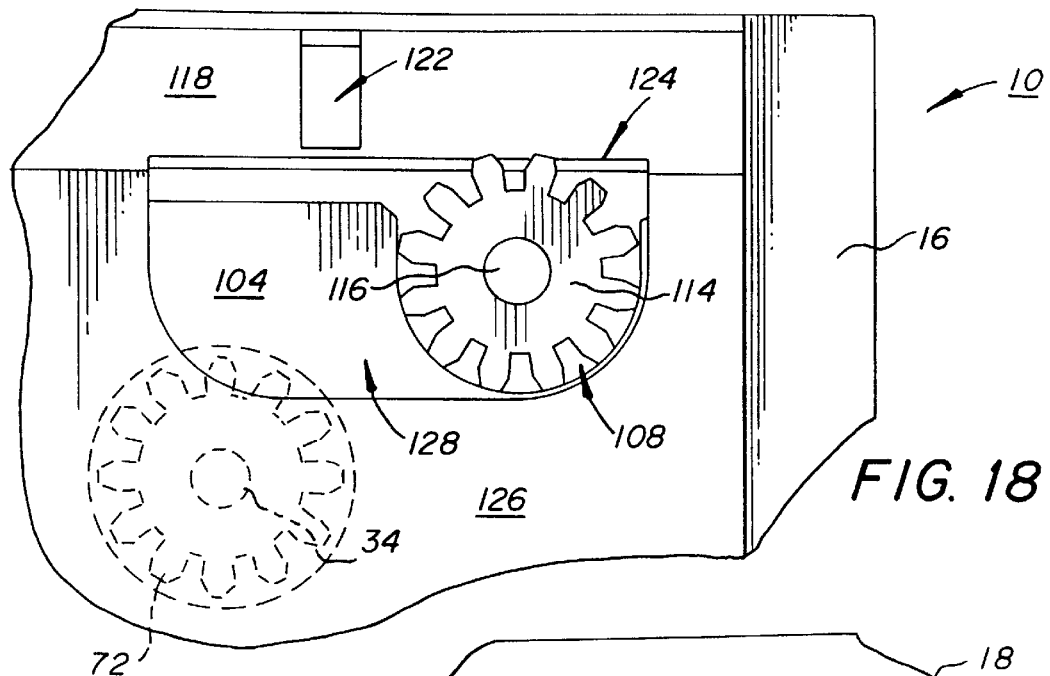
FIG. 18 shows a fragmentary view of the under side of the cassette of FIG. 17.
Figure 19:
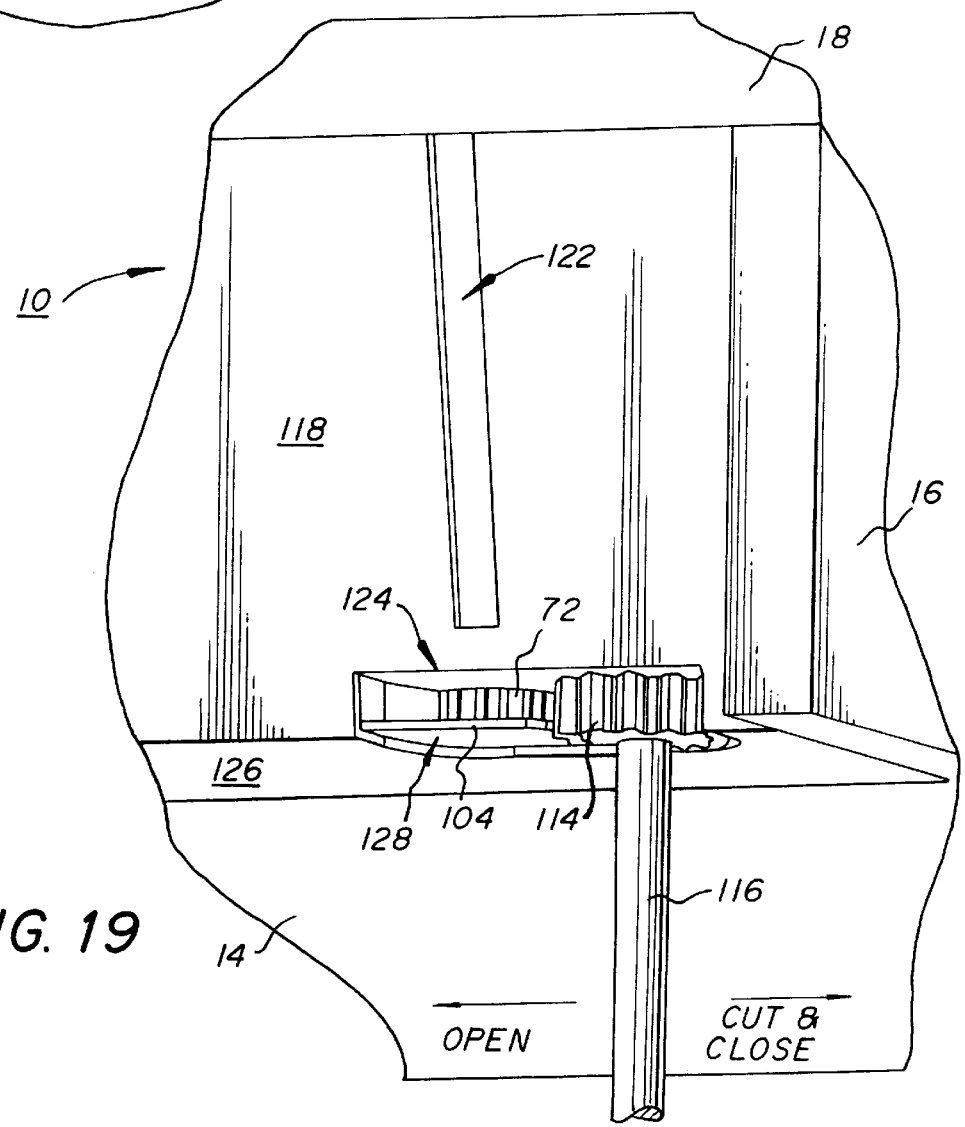
FIG. 19 shows a fragmentary perspective view from below the cassette of FIG. 17.
Figure 20:
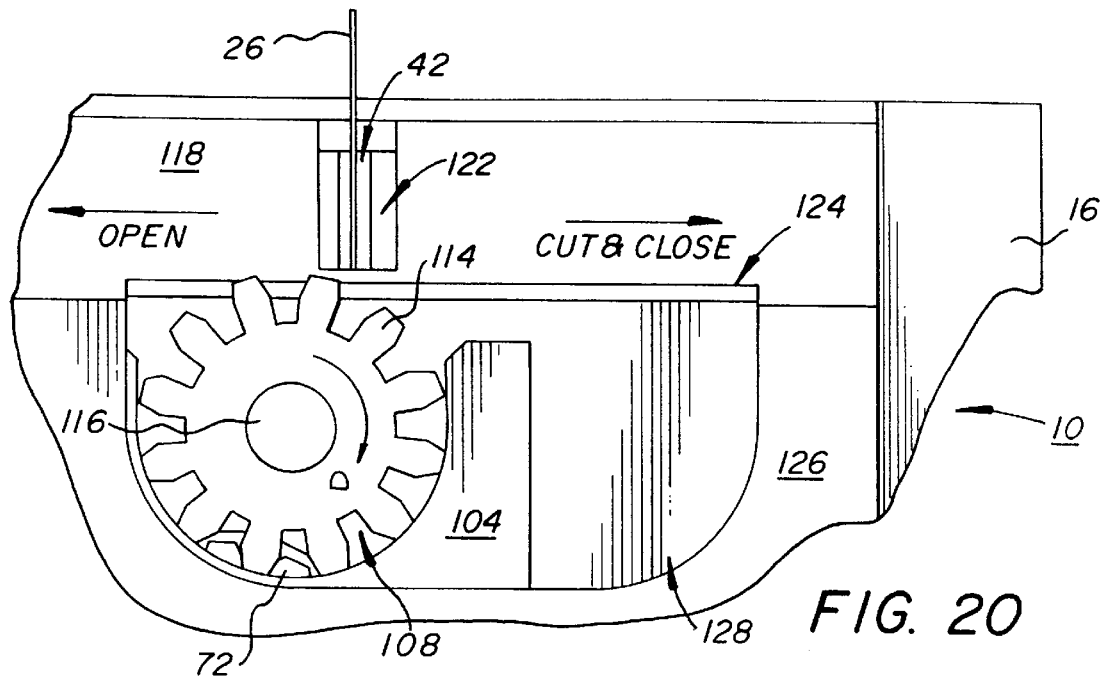
FIG. 20 shows a fragmentary view of the underside of the cassette of FIG. 17, with the driver pinion and driver shaft of the associated apparatus fully engaged with the sliding knife and the driven pinion, in the open position of the knife.
Figure 21:
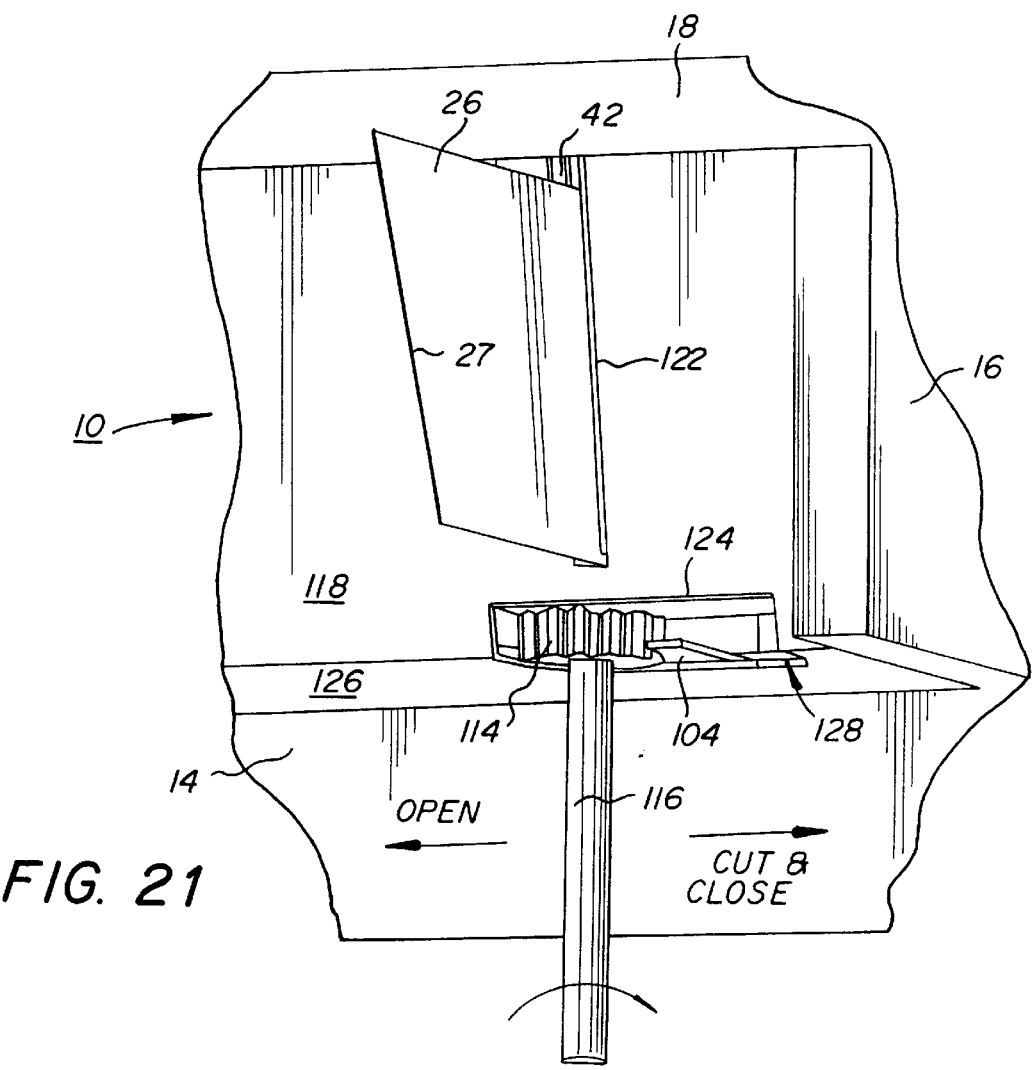
FIG. 21 shows a fragmentary perspective view from the below the cassette of FIG. 20.

In use of the cassette of FIGS. 13 to 21, during sliding insertion of the cassette into an associated apparatus, driver pinion 144 is inserted through slot 124 into recess 108, as shown in FIGS. 16 to 19. When the associated apparatus translates driver shaft 116 to the left as viewed in FIGS. 18 and 19, driver pinion 144 engages a side wall of recess 108 to drive the sliding knife to the left as seen in FIGS. 19 to 21, until a first position is reached in which stop edge 102 engages a side edge of recess 90, thereby opening exit slit 42. Driven pinion 72 is thus engaged by driver pinion 144 which then is rotated to rotate roller 32 and drive leading end 26 from the cassette, as shown in FIGS. 20 and 21. When the desired length of web material has been driven from the cassette, rotation of driver shaft 116, pinion 114 and pinion 72 is stopped. Driver shaft 116 is then translated to the right to engage driver pinion 114 with an opposite side wall of recess 108, until a second position is reached in which cutting edge 100 cuts the web material and, upon completion of the cutting, exit slit 42 is closed by blade portion 98, as shown in FIGS. 18 and 19. During the cutting, blade portion 98 and an edge of exit slit 122 at an inside surface of knife cover 96 are in close sliding engagement, thereby cooperating to scissor the web material as the blade moves to the second, closed position. As a result of the illustrated arrangement of sliding knife 92 and knife cover 96, a cut end of the web material remains within the cassette just behind blade portion 98, ready to be dispensed during a later cycle of operation, there being no wasted portion of the web material left extended from the cassette after cutting.

Referring now to FIGS. 22 to 25, those skilled in the art can understand the structure and operation of a third cassette 10 according to the invention. On the exterior of the housing adjacent exit slit 42 is provided an essentially L-shaped recess 132 which slideably receives a sliding knife holder 134 on which is mounted a flat knife blade 136 having a leading, angled cutting edge 138. A front surface of recess 132 in peripheral wall 16 is angled inwardly at an acute angle α between a plane of wall 16 and a plane of the recess, to enable blade 136 to provide a tapered or angled leading edge on the web material, in the manner and for the purpose previously discussed. Within recess 132 and adjacent exit slit 42 is provided an essentially J-shaped recess 140. A correspondingly shaped knife bed 142 is fixedly mounted in recess 140 with an edge 144 essentially aligned with an edge of exit slit 42. During cutting, knife blade 136 and edge 144 are in close sliding engagement, thereby cooperating to scissor the web material as the blade moves to a closed position. As a result of the illustrated arrangement of sliding knife 136 blade 136 and knife bed 142, a cut end of the web material remains within the cassette just behind blade 136, ready to be dispensed during a later cycle of operation, there being no wasted portion of the web material left extended from the cassette after cutting.

As shown in FIG. 25, a tab 146 near an inside lower edge of knife holder 134 is attached to one end of a tension spring 148, whose opposite end is attached to an anchor 150 on an under edge of peripheral wall 16, thus urging the knife holder and blade to the right, as viewed in FIG. 25, to close exit slit 42. On an outside surface of knife holder 134, a pair of actuator tabs 160 are formed which extend laterally through a horizontal slot 162 formed in a knife cover plate 164 which is fixedly mounted against a pair of stop surfaces 165 spaced outboard of recess 132. The stop surfaces are shown best in FIG. 25 where cover plate 164 has been omitted for ease of illustration. The cover plate comprises along an upper edge a lip 166 for engaging an upper edge of peripheral wall 16; and along a lower edge, a bottom flange 168 for engaging a recess 170 into bottom wall 14, as shown in FIG. 25. As illustrated, recess 170 is the lower wall portion of L-shaped recess 132. An exit slit 172 extends through the cover plate, in alignment with exit slit 42. To hold the assembly of holder 134 and blade 136 firmly within recess 132 and against knife bed 142, a pair of leaf springs 174, 176 are formed integrally in the cover plate, as shown in FIG. 23. Suitable fasteners 177, 178 extend through bottom flange 168 into the body of the cassette to secure the cover plate. The fasteners 177, 178, but not the cover plate, are shown in FIG. 25.

Means are provided for preventing rotation of core 24 or movement of blade 136 from a closed position, during handling or shipment of the cassette. An actuator plunger 180 is slidably mounted in a passage 182 through peripheral wall 16. Within the cassette, a channel 184 is defined along bottom wall 14 between a pair of parallel guide walls 186, 188. A coil spring 190 is slideably received on plunger 180 and is captured between a retainer flange 192 on the plunger and a transverse stop 194 extended between walls 186, 188. A cover plate 196 is attached by suitable fasteners to close the upper side of channel 184. Plunger 180 is used to actuate an anti-backup lever 198 having at one end a pivot axle 200 whose ends are pivotably received in a pair of notches 202, 204 formed in walls 196, 188. A pair of tabs 206 on one end of cover plate 186, only one tab being visible in FIG. 22, retain axle 200 in notches 202, 204. Between lever 198 and bottom wall 14 is positioned an essentially V-shaped leaf spring 208, one end of which bears against stop 194 and the other end bears on bottom wall 14, just outside of stub shaft 20. Leaf spring 208 thus forces lever 198 to pivot upwardly, as viewed in FIG. 24. At its end opposite axle 200, lever 198 includes an upwardly extended latching finger 210 which is forced by spring 208 to extend into one of a plurality of recesses 212 formed in core 24, to keep the core from rotating on the stub shaft during handling or shipment of the cassette. Plunger 180 includes a sliding cam surface 214 which engages lever 198.

When the cassette is installed in an associated apparatus 216, shown fragmentarily in FIG. 24, a probe 218 in the apparatus engages plunger 180 and forces the plunger to move to the left as seen in FIG. 24. This movement causes lever 198 to pivot downwardly, thereby withdrawing latching finger 210 from recess 212 and freeing the roll of web material to rotate. The same movement also releases knife 134, 136. A knife release arm 220 extends laterally from plunger 180 and includes a latching finger 222 which, before engagement of the plunger by probe 218, extends through an opening 224 in recess 132 into an opening 226 in knife holder 134, to prevent movement of the knife during handling or shipment. When plunger 180 is moved to the left in the manner just described, latching finger 222 is pulled out of opening 226, thus freeing the knife for movement to cut the web material.

In use of the embodiment of FIGS. 22 to 25, the cassette is inserted by sliding it into associated apparatus 216, thereby moving plunger 180 and freeing both core 24 and knife 134, 136. Tabs 160 are then engaged by a mechanism, not illustrated, in apparatus 216, to move the knife away from knife bed 142 against the action of spring 148, thus opening exit slit 42. In the manner of the previously described embodiments, a drive roller or sprocket within the cassette is then rotated to drive the web material from the cassette. When a sufficient length has been driven from the cassette, knife 132, 134 is driven back toward the knife bed, thereby cutting the web material and closing exit slit 142. To prevent a trailing end of the just-cut web material from being captured between blade 136 and knife cover plate 164, the knife may be cycled open to release the trailing end, if captured, and then closed. As in all embodiments of the invention, the leading end of the web material remains within the cassette just behind blade 136, ready to be dispensed during a later cycle of operation, there being no wasted portion of the web material left extended from the cassette after cutting.

Parts List

10 . . . cassette
12 . . . body or housing
14 . . . bottom wall
16 . . . peripheral wall
18 . . . removable cover
20 . . . stub shaft
22 . . . roll of photosensitive web material
24 . . . core for 22
26 . . . lead end of material
27 . . . tapered or slanted leading edge
28 . . . idler roller
30 . . . shaft mounted to 14
32 . . . driven roller
34 . . . driven shaft
36 . . . opening in 14 for 34
38 . . . pressure roller
40 . . . shaft mounted to 14
42 . . . exit slit through 16, perpendicular to 14
44,46 . . . parallel guide walls leading to 42
48 . . . raised land or lip on 16
50 . . . L-shaped recess
52 . . . L-shaped sliding knife
54 . . . surrounding, more shallow recess
56 . . . L-shaped knife cover
58 . . . flat blade portion
60 . . . leading, angled cutting edge of 52
62 . . . trailing stop edge of 58
64 . . . flat actuator portion, perpendicular to 58
66 . . . actuator hole
68 . . . trailing stop edge of 64
70 . . . clearance slot
72 . . . driven pinion mounted on exterior end of 34
74 . . . centrally located latch tooth
76 . . . curved trailing edge of 70
78 . . . flat blade cover portion
80 . . . raised land or lip on 78
82 . . . exit slit aligned with 42
84 . . . flat actuator cover portion, perpendicular to 78
86 . . . hole for 72
88 . . . slot for actuator probe (not illustrated) to engage 66
90 . . . essentially L-shaped recess set into 16
α . . . acute angle between plane of 16 and plane of 90
91 . . . bottom edge of front surface of 90
92 . . . sliding knife
94 . . . surrounding, more shallow recess
96 . . . knife cover
98 . . . flat blade portion
100 . . . leading, angled cutting edge
102 . . . trailing stop edge
104 . . . flat actuator portion
106 . . . horizontal access slot in 98
108 . . . essentially U-shaped recess in 104
110 . . . recess into under side of 90 to receive 72
112 . . . recess into under side of 90 and open into 110
114 . . . driver pinion
116 . . . driver shaft in associated apparatus
118 . . . flat blade cover portion
120 . . . lip to engage top edge of 16
122 . . . exit slit aligned with 42
124 . . . essentially horizontal access slot for 114, opposite 112
126 . . . flat actuator cover portion
128 . . . essentially horizontal access slot opposite 112 and open into 124
130 . . . lip to engage rear of 94
132 . . . recess set into 16
134 . . . sliding knife holder
136 . . . flat knife blade
138 . . . leading angled cutting edge
140 . . . essentially J-shaped recess set into 132
142 . . . fixed knife bed
144 . . . edge of 142 aligned with one side of 42
146 . . . tab on inside lower edge of 134
148 . . . spring to hold 134, 136 in closed position
150 . . . anchor to under edge of 16
160 . . . actuator tabs on outside lower edge of 134
162 . . . slot
164 . . . knife cover plate
165 . . . stop surfaces for 164
166 . . . lip to engage top edge of 16
168 . . . bottom flange of 164
170 . . . recess into 14
172 . . . exit slit aligned with 42
174, 176 . . . leaf springs integrally formed in 164
177, 178 . . . fasteners
180 . . . actuator plunger for latching core and knife
182 . . . passage through 16
184 . . . channel on 14
186, 188 . . . parallel guide walls
190 . . . spring on 180
192 . . . retainer flange on 180
194 . . . transverse stop between 186, 188
196 . . . cover plate
198 . . . anti-back up lever
200 . . . pivot axle
202, 204 . . . notches in 186, 188
206 . . . tabs on end of 196
208 . . . essentially V-shaped leaf spring
210 . . . latching finger on 198
212 . . . recess in 24 to receive 210
214 . . . sliding cam surface on 180
216 . . . associated apparatus
218 . . . probe to engage 180
220 . . . knife release arm
222 . . . latching finger
224 . . . opening in 132 for 222
226 . . . opening in 134 for 222

While my invention has been shown and described with reference to particular embodiments thereof, those skilled in the art will understand that other variations in form and detail may be made without departing from the scope and spirit of my invention.

Having thus described my invention in sufficient detail to enable those skilled in the art to make and use it, I claim as new and desire to secure Letters Patent for:

1. A cassette for light-sensitive web material, comprising:

a hollow cassette housing having a peripheral wall with an outside surface;

a first exit slit extending through said peripheral wall to said outside surface;

means, located within said housing, for rotatably supporting a roll of photosensitive web material;

means, located within the housing, for engaging a leading end of a web material to drive the web material through said first exit slit; and a knife blade adjacent said first exit slit, said knife blade having a cutting edge extended at an acute angle to said first exit slit; and means for slidably mounting said knife blade for movement between a first position in which said first exit slit is open, and a second position in which both the web material has been cut by said cutting edge and said first exit slit has been closed by said knife blade to prevent entry of light into said housing through said first exit slit.

2. A cassette according to claim 1, wherein said knife blade is flat.

3. A cassette according to claim 1, further comprising a roll of photosensitive material mounted on said means for rotatably supporting.

4. A cassette according to claim 1, wherein said means for engaging comprises a driven roller and a pressure roller for engaging a web, and a drive pinion connected to said driven roller and accessible from outside said housing.

5. A cassette according to claim 4, further comprising:

a slot through said knife blade for permitting access to said drive pinion as said knife blade moves between said first and second positions.

6. A cassette according to claim 1, wherein said means for engaging includes a driven member which is accessible externally of said housing, further comprising:

a slot through said knife blade for permitting access to said driven member as said knife blade moves between said first and second positions.

7. A cassette according to claim 1, wherein said knife blade is mounted on an exterior surface of said housing.

8. A cassette according to claim 1, further comprising a knife cover for said knife blade, said knife cover being fixedly mounted on said housing with said knife blade between said knife cover and said housing, said knife cover including a second exit slit positioned opposite said first exit slit, said knife cover being in sliding engagement with said knife blade, whereby said knife blade and said second exit slit scissor the web material as said knife blade moves to said second position, thereby cutting the web material and leaving a cut end of the web material inside said housing at said first exit slit closed by said knife blade.

9. A cassette according to claim 8, wherein said knife cover comprises a further opening to permit external access to said means for engaging and a further slot to permit external access to said knife blade.

10. A cassette according to claim 8, further comprising a roll of photosensitive material mounted on said means for rotatably supporting.

11. A cassette according to claim 8, further comprising a first recess in said housing for said knife blade and a second recess in said housing, surrounding said first recess, for said knife cover.

12. A cassette according to claim 8, wherein said knife blade is mounted on an exterior surface of said housing.

13. A cassette according to claim 1, wherein said knife blade is angled to provide a tapered leading edge on said web material.

* * * * *